(12) United States Patent
Zamojdo et al.

(10) Patent No.: US 6,272,431 B1
(45) Date of Patent: Aug. 7, 2001

(54) METHOD FOR DISPLAYING A MAP IN A VEHICLE EN-ROUTE GUIDANCE SYSTEM

(76) Inventors: Thomas Zamojdo, 2904-J Westbury Lake Dr., Charlotte, NC (US) 28269; Christopher Thomas Grabowski, 136 Carlton Ave., Apt. B, Piscataway, NJ (US) 08855

(*) Notice: Subject to any disclaimer, the term of this patent is extended or adjusted under 35 U.S.C. 154(b) by 0 days.

(21) Appl. No.: 09/067,789

(22) Filed: Apr. 28, 1998

Related U.S. Application Data

(60) Provisional application No. 60/044,349, filed on Apr. 29, 1997.

(51) Int. Cl.[7] .................................................. G01C 21/00
(52) U.S. Cl. ............................................. 701/211; 348/115
(58) Field of Search ...................................... 701/211, 208, 701/212; 348/115, 118, 116, 113; 340/995; 345/7

(56) References Cited

U.S. PATENT DOCUMENTS

| | | | |
|---|---|---|---|
| 4,884,135 | * 11/1989 | Schiffman | 340/980 |
| 5,519,410 | * 5/1996 | Smalanskas et al. | 345/7 |
| 5,739,773 | * 4/1998 | Morimoto et al. | 340/995 |
| 5,936,553 | * 8/1999 | Kabel | 340/995 |

OTHER PUBLICATIONS

Anselm Spoerri, "Novel Route Guidance Displays", IEEE IEE VNIS '93, pp. 419–422.*

* cited by examiner

Primary Examiner—Gregory C. Issing
(74) Attorney, Agent, or Firm—Philip Summa, P.A.

(57) ABSTRACT

An apparatus and method for displaying a virtual map image slightly above the line of sight of a driver of a vehicle. The apparatus and method provide the virtual map image that is in a reflective relationship with the surrounding terrain thereby providing a map that is continuously in the same general azimuthal relationship to the driver as is the surrounding terrain. The virtual map may be scaled or distorted to provide information to a driver concerning distant objects and locations that would not ordinarily be available on heads-up map of the surrounding terrain.

14 Claims, 5 Drawing Sheets

METHOD FOR DISPLAYING A MAP IN A VEHICLE EN-ROUTE GUIDANCE SYSTEM

This application claims benefit to provisional application Serial No. 60/044,349, filed Apr. 29, 1997.

BACKGROUND

1. Field of Invention

This invention relates generally to an apparatus and method for displaying a map as a navigational aid in a vehicle and, more particular to a method for presenting a map.

2. Description of Prior Art

There is a considerable interest in providing a driver of a motor vehicle with en-route guidance system, usually in the form of computer generated voice messages and/or of real-time maps of the relative vicinity of the motor vehicle.

If in such systems the above mentioned map is used, it is displayed on computer driven screen such as a back-lit LCD or CRT, such screen located somewhere in the dashboard or in the center console as discussed in U.S. Pat. Nos. 4,914,605 and 5,398,188. Also, there are known solutions to displaying any visual information on a "head-up display" where the image is reflected in the vehicle's windshield as discussed in U.S. Pat. Nos. 4,961,625 and 5,422,812 and 5,504,622 or in a separate mirror member as discussed in U.S. Pat. No. 5,469,298 in such a way that the image appears suspended in mid-air in front of the vehicle, with the virtual image focus at or near infinity or practically at infinity.

However, all the prior art display systems fail to allow the driver to obtain all the visual information necessary for successful navigation in a fashion sufficiently fast, easy and intuitive as to limit the distractions to safe level, a level comparable to, for example, glancing into rear-view mirrors or reading traffic and road signs. Instead, they require a substantial mental effort to study and memorize the map presented, and then to mentally correlate the map features with the real landmarks as seen from the moving vehicle. The voice-only systems frequently give the diver commands that are too late to be safely executed or at other times too early to be remembered.

OBJECTS AND ADVANTAGES

The main objects and advantages are as follows:

(a) to allow the driver to obtain all the visual information necessary for successful navigation in a fashion sufficiently fast, easy and intuitive as to limit the distractions to safe level; a level comparable to, for example, glancing into rear-view mirrors or reading traffic and road signs;

(b) to allow the driver ample time to get prepared to make a maneuver necessary to follow desired route such as slow down, make lane changes, take highway exit, etc.;

(c) to allow the diver to obtain a mental image of road layout in his vicinity and thus allow the driver to make instant route changes based on observed road conditions such as bypass traffic jams and accidents.

(d) to allow the driver to instantly eliminate the display by tapping brake pedal or by pressing a control button

DRAWING FIGURES

Same elements presented in different drawings have the same reference numbers.

Figure 1:
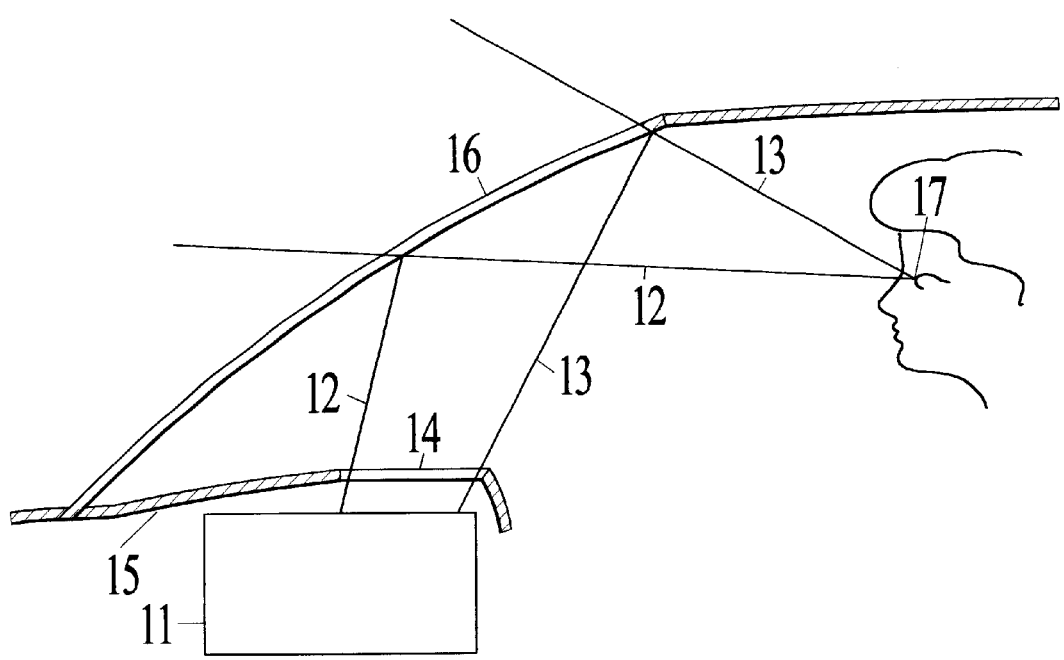

FIG. 1—Shows longitudinal cross section of a car with our apparatus

Figure 2:
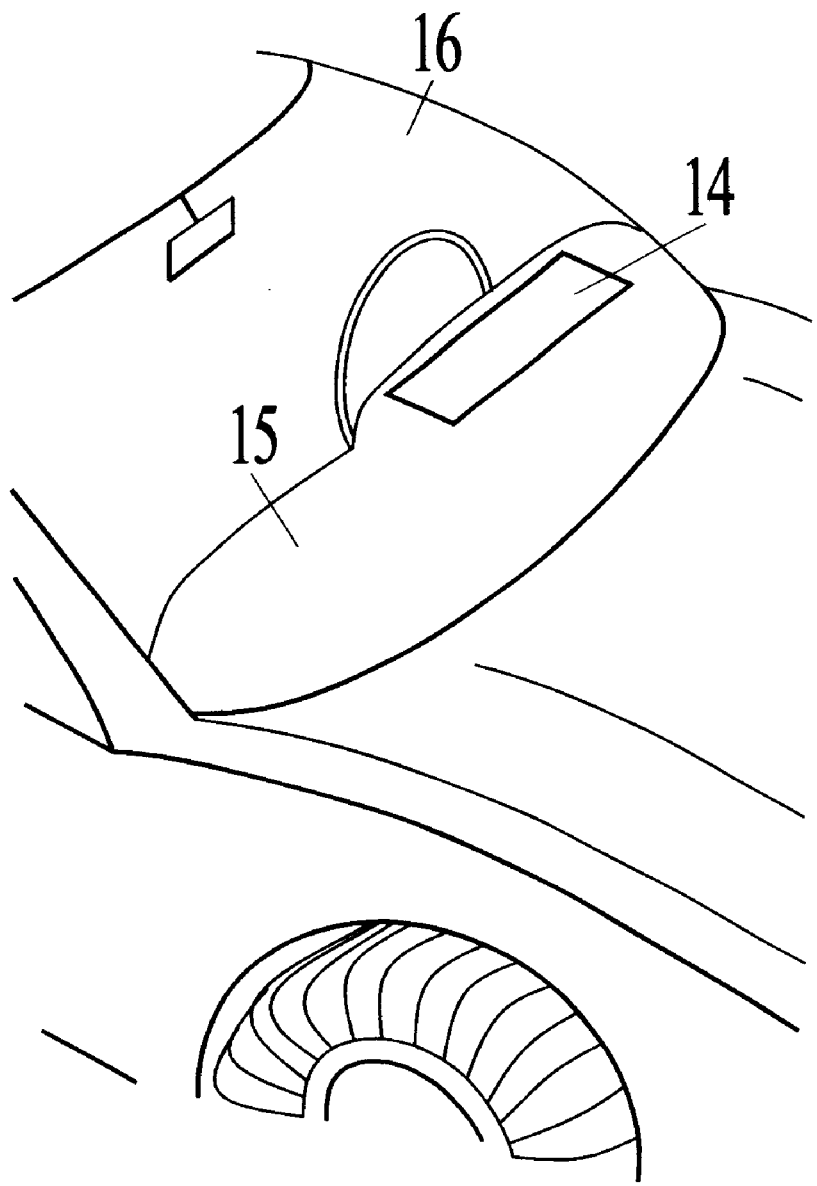

FIG. 2—Shows oblique view of a car as above showing through the car's windshield (16) size and position of the window (14) of the apparatus on the car's dashboard (15)

Figure 3:
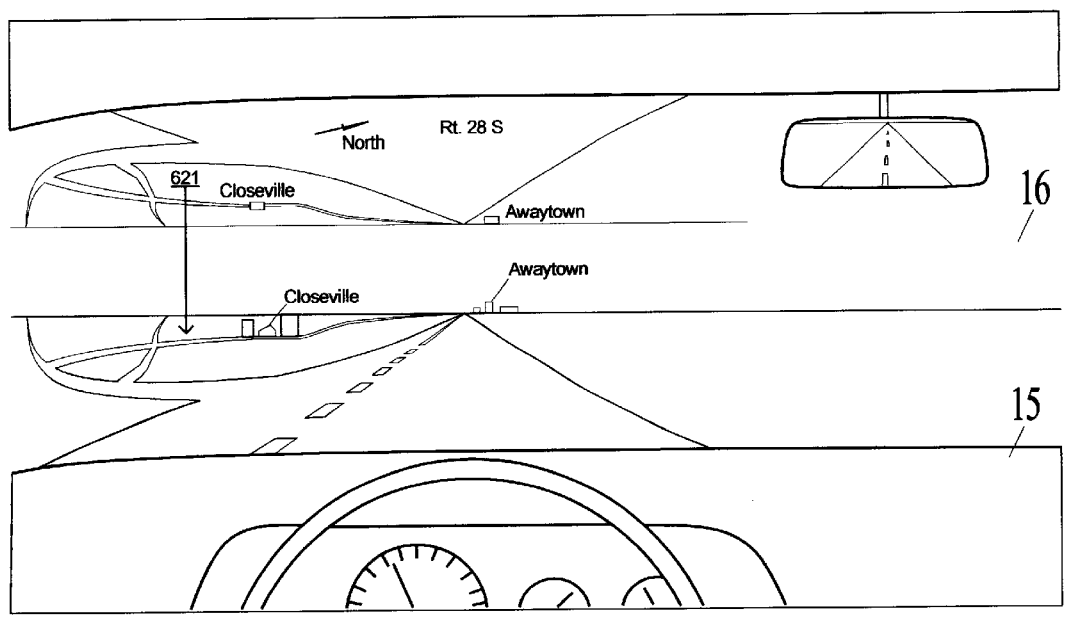
Figure 4:
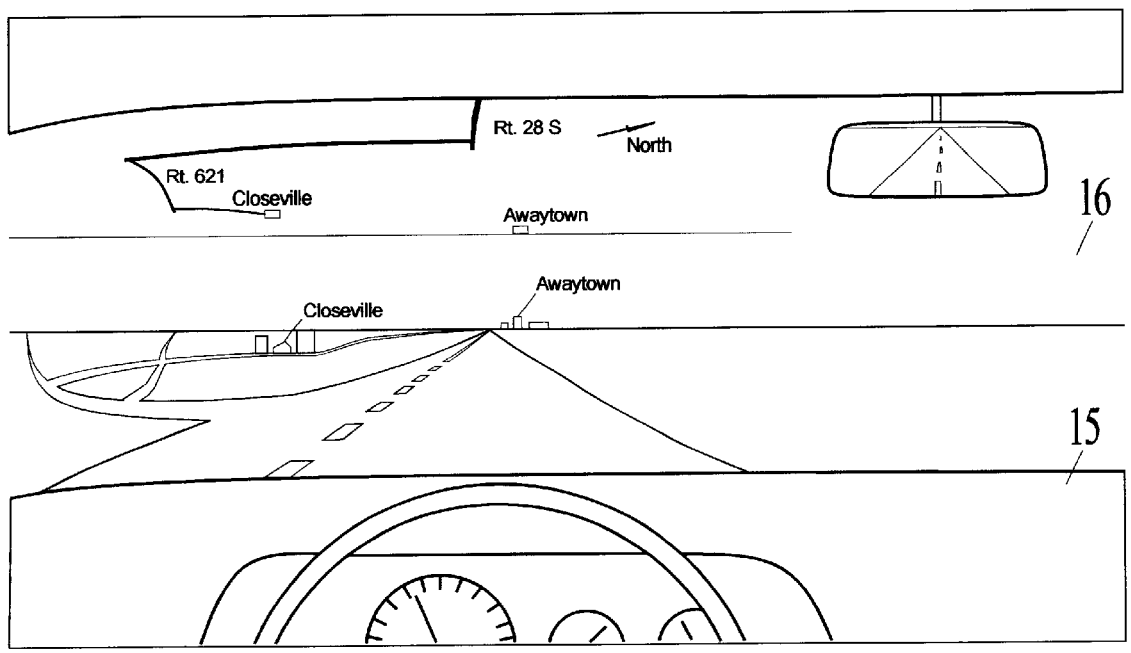
Figure 5:
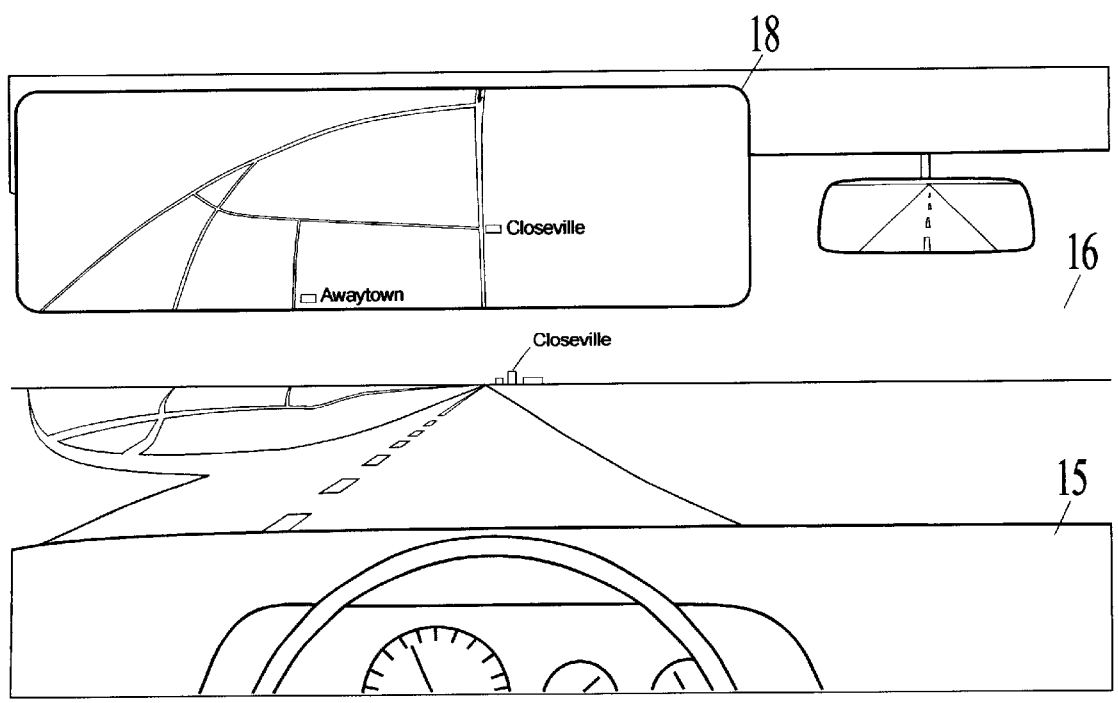

FIG. 3—Shows an example a schematic of a view from the drivers position showing through the windshield of the real roads ahead and virtual image displayed by one possible embodiment of the apparatus, as it appears to the driver FIG. 4—Shows a schematic of a view from the drivers position showing through the windshield of both the roads ahead and virtual image displayed by another possible embodiment of the apparatus, as it appears to the driver FIG. 5—Shows a schematic of a view from the drivers position showing through the windshield the roads ahead and virtual image displayed by another possible embodiment of the apparatus, using a reflective member separate from the windshield, as it appears to the driver.

REFERENCE NUMERALS IN DRAWINGS

11—display apparatus
12—light ray forming the bottom of the virtual image
13—light ray forming the top of the virtual image
14—window of the apparatus
15—vehicle's dashboard
16—vehicle's windshield
17—driver's eye
18—separate reflective member

DESCRIPTION

To allow a mental image of the overall position of a car relative to a desired route to be quickly acquired, it is hereupon proposed to display the map information, possibly including a previously entered desired route or destination, in a head-up display in such a way that the presented image appears to be substantially parallel to the ground traversed and high above it, so any feature seen on the ground lies in substantially the same azimuth direction from the driver as its representation if it is shown on the map displayed. In other words, the map image substantially corresponds to a mirror image of the ground, where the imaginary mirror would be an infinite horizontal plane, parallel to the ground and suspended sufficiently high above it to allow sufficiently large area of the ground to be seen by the driver, but at the same time sufficiently low to make it easy to correlate the displayed map data with the ground features. A few hundred feet could be an useful value, and it could be user-adjustable. Another way to think about the orientation of the image displayed would be to imagine that the seen image of the map is a giant map suspended high above the ground in the proper position and orientation relative to the features on the ground and that it is being viewed from "below" (i.e., thru the paper if it would be a printed paper map).

The car then appears to be moving between the real ground and the map which appears to be stationary relative to the ground, and a portion of this map can be seen "thru" the head-up display.

In practical implementation, there will be only a limited area visible in the head-up display, and therefore it may be useful to somewhat distort presented map as compared to an "ideal" described above in such a way that:

1) an "image scale" of the map changes with distance, from the point corresponding to the car position, differently than what laws of perspective would imply, for example nearby area may be shown at large-scale for easy correlation with the ground, but farther away areas may be quickly reduced in size so the more distant places can also fit on the same map, and 2) the point on the map corresponding to the car position is not directly above the car but instead is moved somewhat forward so it can be seen in the field of view of the head-up display. In addition, such a position may be marked on the map for easy reference.

The head-up display final reflecting surface or surfaces may consist of:

1) a fully reflective or semi-transparent mirror member positioned substantially where the driver's sun visor would be (see FIG. 5), or 2) the vehicle's windshield, possibly a large portion of an entire upper area as seen by the driver (see FIG. 3 and 4), or 3) both the windshield and a mirror member in the position as in (1), said member allowing for an additional field of view for example, an upward looking view. Images reflected in said windshield and said mirror member match substantially seamlessly to form contiguous image, or In case 3) above, each said final reflecting surface may be illuminated by a separate computer driven screen and a separate sets of coupling optical elements. A set of coupling optical elements comprises lenses and/or mirrors in the path of the light emitted from the screen before it reaches the above mentioned final reflecting surface. Alternatively, any combination of the said reflecting surfaces may be illuminated by a single computer driven screen and a shared set of coupling optical elements.

To further facilitate quick correlating of the real ground landmarks and the map, it may be useful to connect such landmarks with the corresponding points on the map using, for example, virtual 3-D connecting lines or arrows (see arrow for route 621, FIG. 3). This may be practical if the a large area of windshield is used as the head-up display reflecting surface.

Additionally, it is proposed that the activation/deactivation of the displayed map image which is not necessarily the same as powering on/off of the whole vehicle navigation system, will be accomplished by pressing a conveniently located switch, for example located on the steering wheel) to toggle the display on and off. It is realised that, for safety sake, it should be very easy to switch off the map display when a demanding driving situation occurs, therefore it is suggested that pressing the brake pedal should automatically toggle off (i.e., deactivate) the map display if it is active. This would be similar to brake action in cruise control systems. An override to such brake pedal action can be provided: if a driver presses and then holds down said display switch while the map display is active and before and thru the instant of pressing of the brake pedal, the map display stays on. To implement such an override feature without ambiguity, the "off" action of the display switch may be executed at the moment of the display switch release, not at the moment of said switch press-down; if a brake is activated after the display switch has been pressed down (i.e., while the display was "on") but before said switch has been released, the normal "display off" action of touching the brake pedal is not executed and then the map display stays "on" even after the switch is released. The "on" action of the display switch may be always executed at the moment of the pressing down of the display switch, for a faster, more pleasing response. represented on the virtual map. At many points along the traveled route, a distant destination will not be directly in front of a driver because roads are seldom straight. Much of the time the ultimate destination will fall outside of the driver's field of view and will not be represented on the section of the horizon shown in the virtual image. Accordingly, distorting the virtual image so that it presents qualitative information regarding distant objects and destinations may be advantageous in certain circumstances. Specifically, the virtual image is gradually distorted toward the edges of the image so that distant objects that are not in the driver's field of view or that would not ordinarily appear on the virtual map because of their distance are shown on the map.

For example, a distant destination which in reality is 90 degrees to the driver's left of the driver's center is shown on the virtual map as being only 45 degrees to the left of center, thus falling into the field of view on the virtual map. In this manner, the virtual map will present the destination area much of the time, if not most of the time and thus aid in comprehension of the current position along the route.

In a preferred embodiment, the distortion begins at a distance sufficient from the vehicle so as not to distract the driver or misrepresent the surrounding terrain that will immediately effect the decisions made by the driver. Further, the distortion is implemented slowly and progresses in a continuous increasing fashion until it is most severe at the maximum extent of the map.

As known to those skilled in the art of cartography, map images may be distorted using a mathematically generated scale. The precise mathematical formulas may vary depending upon the type of map or desired amount of distortion. FIGS. 21–33 are examples of map distortion that may be used in this embodiment of the invention.

FIG. 21 is a polar grid representing an area in front of the vehicle. A set distance identified as Dmax defines this area. This polar grid represents a map of the area encompassed by $D_{max}$. FIG. 22 is a perspective view of the grid shown in FIG. 21. FIG. 23 is an example of how the polar grid of FIG. 21 may be distorted in accordance with this embodiment of the invention. FIG. 23 is the grid image from FIG. 21 distorted to make the outer areas of the grid closest to $D_{max}$ appear closer to the origin of the grid (the vehicle) while points close to the origin of the grid (the vehicle) are not visibly affected. This distortion was accomplished using formula 40 where for any distance D between the point of origin and $D_{max}$ along any azimuthal direction:

(40) New Scaled Distance=$D*(1-(0.2*((D/D_{max})**4)))$

In a further embodiment, the map image may be distorted to bring objects that are to the far left or right of the driver into the image projected in front of the driver. FIG. 24 represents the polar grid image of FIG. 23 (where extreme distances are made closer using formula 40) that is further distorted to adjust toward the center objects that are to the extreme left or right of the driver. This centering of extreme left and right objects is accomplished in this example through use of the formula 41 where:

"OA" represents the old azimuth or the angle (in degrees) between −90 degrees (90 degrees to the left from straight ahead) and +90 degrees (90 to degrees to right from straight ahead) possessed by an object shown on the grid of FIG. 23;

"NA" represents the new azimuth or the scaled azimuth utilized in FIG. 24 for the object shown on the grid of FIG. 23; and "ND" represents the new distance or scaled distance presented on the distorted map image of FIG. 24 for the object:

(41) NA=$OA*(1-(0.7* (|OA|/90)**0.5)*((ND/D_{max})**3)))$

FIG. 25 is a perspective view of the grid image shown in FIG. 24. FIG. 26 is a reflective image of FIG. 25 corresponding to a projection in the head-up display typically utilized in the practice of the invention. FIGS. 27–33 are further examples of how the virtual

What is claimed is:

1. An apparatus for displaying a map for use by a driver in a vehicle, the apparatus comprising:
   means for storing and retrieving map information covering the area traveled by the vehicle;
   means for determining the position and direction of movement of the vehicle; and
   means for displaying a virtual map image in a reflective member substantially in front and above the horizontal line of sight of the driver of the vehicle, said virtual map image being focused substantially at infinity and extending toward infinity in the direction of the horizon and being oriented such that is appears to be substantially parallel to the ground and positioned above the ground in such a way that any feature represented on the map lies in substantially the same azimuth direction from the driver as it does on the ground; and such that for features on the ground that are lying in substantially the same azimuthal direction but at different distances from the vehicle, those features closer to the vehicle are displayed higher on the virtual map image than those features farther from the vehicle; and with the azimuthal direction of the features displayed on the virtual map image being in a generally reflective relationship with the azimuthal direction of those same features on the ground.

2. An apparatus according to claim 1 further comprising a switch that deactivates the virtual map image upon application of a braking mechanism.

3. An apparatus according to claim 2 further comprising an override switch which will prevent deactivation of the virtual map image upon application of a braking mechanism.

4. An apparatus according to claim 1 wherein said virtual map image differentiates the route traveled by the vehicle from other information presented on the virtual map image.

5. An apparatus according to claim 1 further comprising a virtual map image wherein those features displayed in the virtual map image that are closer to the vehicle appear larger than those features farther from the vehicle.

6. An apparatus for displaying a virtual map image for use by a driver in a vehicle, the apparatus comprising:
   means for storing and retrieving map information covering the area traveled by the vehicle;
   means for determining the position and direction of movement of the vehicle; and
   means for displaying a virtual map image in a reflective member substantially in front and above the horizontal line of sight of the driver of the vehicle, said virtual map image being oriented in such a way that any feature represented on the map lies in substantially the same azimuth direction in the driver's field of vision as it does on the ground; and such that for features on the ground that are lying in substantially the same azimuthal direction but at different distances from the vehicle, those features closer to the vehicle are displayed higher on the virtual map image than those features farther from the vehicle thereby presenting the driver a vertical representation of a virtual map image that is a substantially reflective representation of the surrounding terrain.

7. An apparatus according to claim 6 further comprising a switch that deactivates the virtual map image upon application of a braking mechanism.

8. An apparatus according to claim 7 further comprising an override switch which will prevent deactivation of the virtual map image upon application of a braking mechanism.

9. An apparatus according to claim 6 wherein said virtual map image differentiates the route traveled by the vehicle from other information presented on the virtual map image.

10. An apparatus according to claim 6 further comprising a virtual map image wherein those features displayed in the virtual map image that are closer to the vehicle appear larger than those features farther from the vehicle.

11. A method for displaying a map in a vehicle, the method comprising:
    storing and retrieving map information covering the area traveled by the vehicle;
    determining the position and direction of movement of the vehicle; and
    displaying a virtual map image in a reflective member substantially in front and above the horizontal line of sight of the driver of the vehicle, said virtual map image extending toward infinity in the direction of the horizon, said virtual map image being oriented such that it appears to be substantially parallel to the ground and positioned above the ground in such a way that any feature on the ground is represented on the map as being in substantially the same azimuth direction as it is perceived by the driver on the ground and such that for features on the ground that are lying in substantially the same azimuthal direction but at different distances from the vehicle, those features closer to the vehicle are displayed higher on the virtual map image than those features farther from the vehicle; and with the azimuthal direction of the features displayed on the virtual map image being in a reflective image relationship with the azimuthal direction of those same features on the ground.

12. A method according to claim 11 wherein as part of the step of displaying the virtual map image those features displayed in the virtual map image that are closer to the vehicle appear larger than those features farther from the vehicle.

13. A method for displaying a map in a vehicle, the method comprising:
    storing and retrieving map information covering the area traveled by the vehicle;
    determining the position and direction of movement of the vehicle; and
    displaying a virtual map image in a reflective member substantially in front and above the horizontal line of sight of the driver of the vehicle, said virtual map image being oriented in such a way that any feature represented on the map lies in substantially the same azimuth direction in the driver's field of vision as it does on the ground; and such that for features on the ground that are lying in substantially the same azimuthal direction but at different distances from the vehicle, those features closer to the vehicle are displayed higher on the virtual map image than those features farther from the vehicle thereby presenting the driver a vertical representation of a virtual map image that is a substantially reflective representation of the surrounding terrain.

14. A method according to claim 13 wherein as part of the step of displaying the virtual map image those features displayed in the virtual map image that are closer to the vehicle appear larger than those features farther from the vehicle.

* * * * *